UNITED STATES PATENT OFFICE.

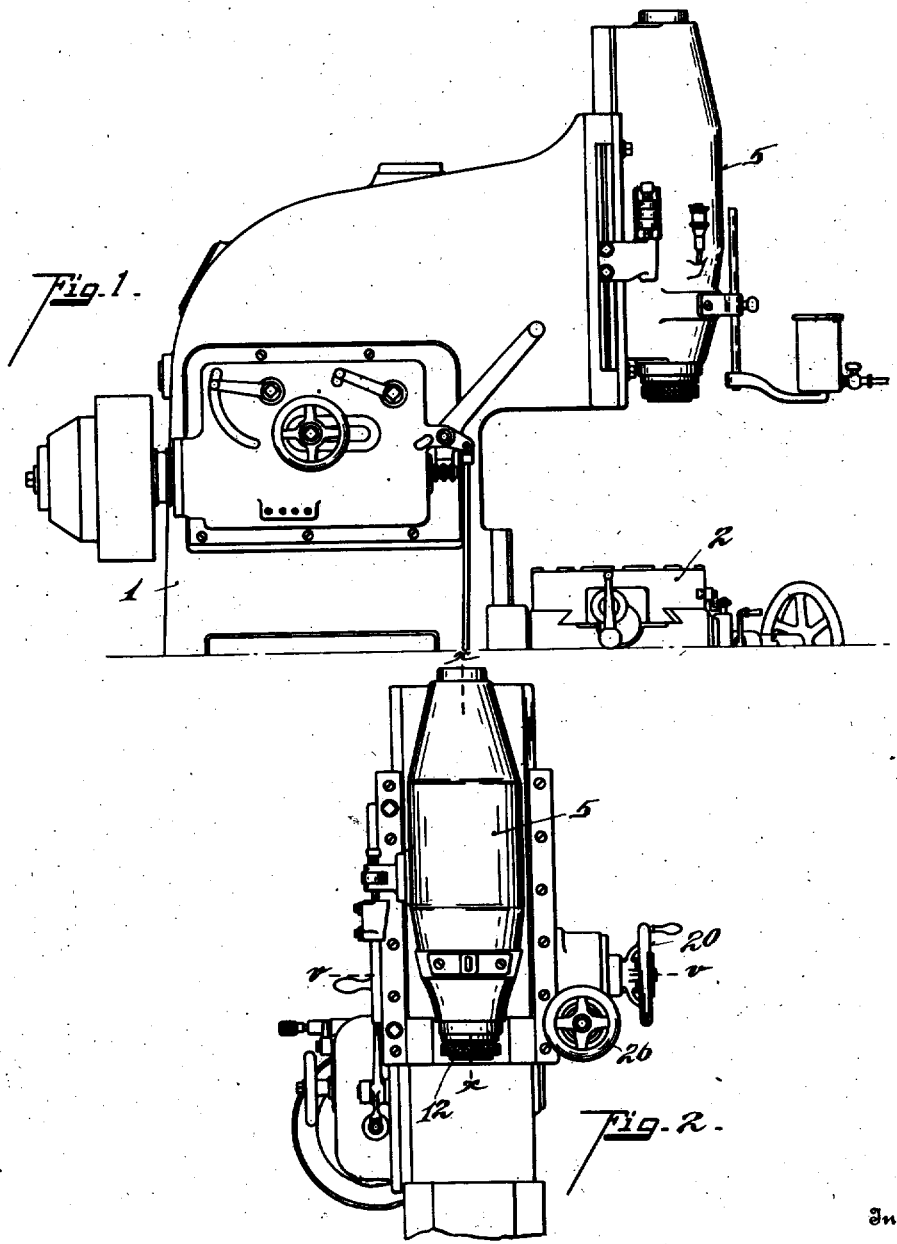

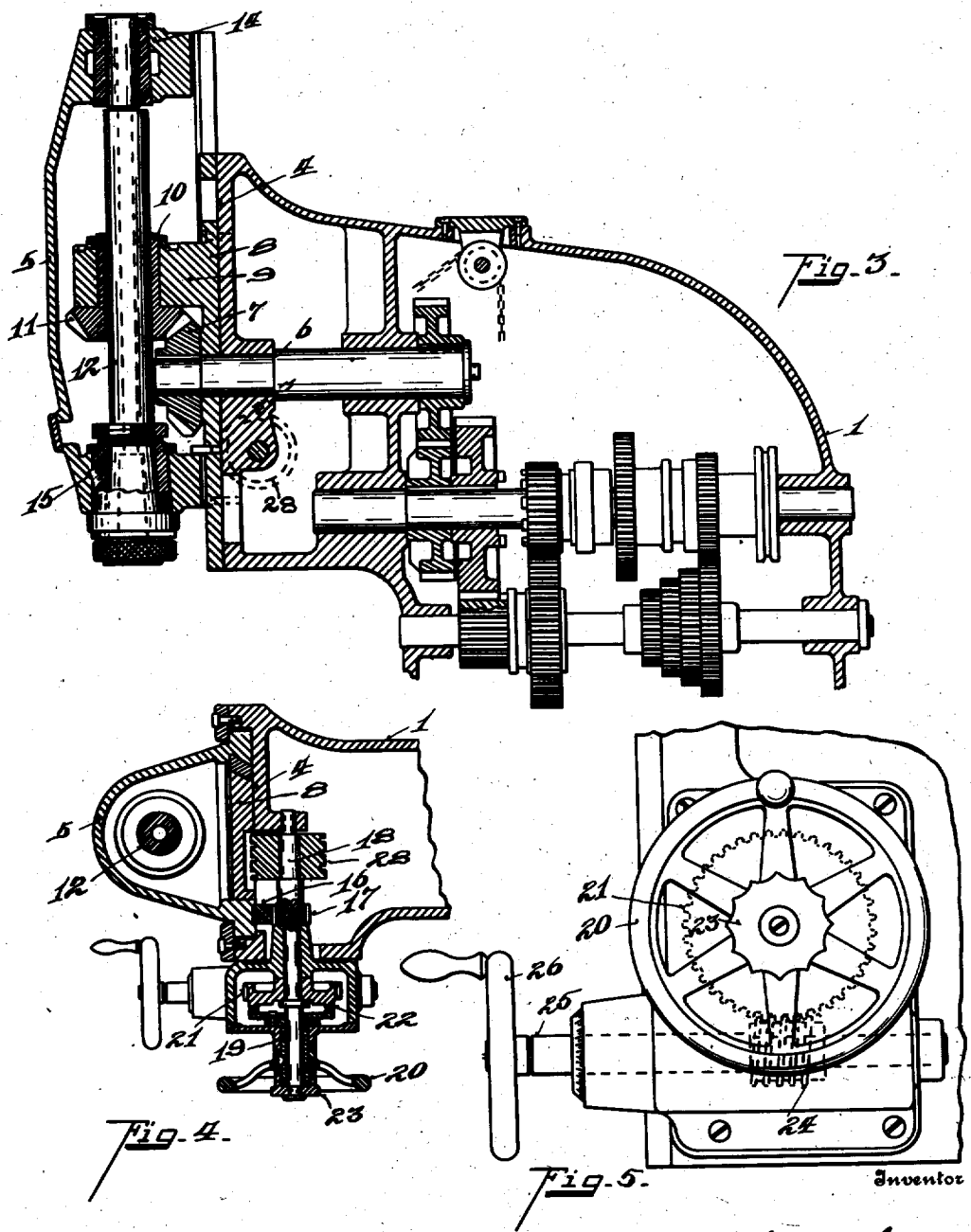

ADOLPH L. DE LEEUW, OF HAMILTON, OHIO, ASSIGNOR TO THE CINCINNATI MILLING MACHINE COMPANY, OF CINCINNATI, OHIO, A CORPORATION.

MILLING-MACHINE.

974,036.

Specification of Letters Patent.  Patented Oct. 25, 1910.

Application filed September 11, 1906. Serial No. 458,694.

*To all whom it may concern:*

Be it known that I, ADOLPH L. DE LEEUW, a citizen of the United States, residing at Hamilton, in the county of Butler and State of Ohio, have invented certain new and useful Improvements in Milling-Machines, of which the following is a specification.

My invention relates to an improvement in a vertical milling machine, by which is understood a machine in which the spindle is suspended in a vertical plane from the column. In the machines of this type, now commonly in use, the spindle is mounted in independent bearings, the lower one of which is vertically gibbed to the column and the power is applied to the spindle above the point of upper bearing. As a result, the operation of the cutter imparts a strain which is thrust upon the gib-way bearings, so that the instant any wear or lost motion occurs, the spindle bearings lose their alinement without any possibility for readjustment. The power is also applied at the maximum distance from the cutter which greatly increases the torsional strain on the spindle.

The object of my invention is to avoid these undesirable features. In other words, to produce a vertical miller in which the spindle is journaled in two relatively fixed bearings, supported by a vertically adjustable head, the power being applied at a point between the bearings internal of the head. Thus the point of drive is applied as nearly as possible to the cutter and between supported ends of the spindle, while the bearings, being a part of a one-piece head, bodily adjustable on the column, insures the perfect preservation and alinement of the spindle bearings.

Another object of the invention is to provide a gib-way attachment to the column for the vertically adjustable head, which attachment shall have provision for delicate adjustment in a vertical plane, so that the head itself can be vertically alined with absolute precision. This valuable desideratum could not be realized if the gib-way were immutably formed on the column and should happen to be in error as to its alinement.

In carrying out this latter idea, I further provide a construction in which the piece for the head is adjustably secured upon the column in a manner which will admit of the adjustment without any interference with the driving mechanism for the spindle.

The features of the invention are more fully set forth in the description of the accompanying drawings, forming a part of this specification, in which:—

Figure 1 is a side elevation of the upper portion of a vertical milling machine embodying the features of my invention. Fig. 2 is a front elevation thereof. Fig. 3 is an enlarged section on line *x*, *x*, Fig. 2. Fig. 4 is an enlarged section on line *v*, *v*, Fig. 2. Fig. 5 is an enlarged detail side elevation of the head adjusting mechanism.

1 is the vertical column having a knee upon which the table 2 is gibbed in the usual manner. The upper end of the column has the vertically planed surface 4 for the reception of the spindle head 5. Horizontally journaled in the upper end of the column is the spindle driving shaft 6, having the beveled driving gear 7 on the outer end.

8 represents a gib-face-plate secured on the column through which the shaft 6 projects, (see Figs. 3 and 4). This plate 8 is preferably slotted receiving the bolt for connecting it to the plane face 4 of the column, which permits the plate to be swiveled upon the shaft 6 as a center.

9 represents a bracket formed on the plate 8, in which is journaled the sleeve 10 of the spindle bevel gear 11, meshing with gear 7. The spindle 12 is splined with reference to the sleeve 10.

5 represents a spindle head having in its opposite ends the spindle bearings 14, 15. This head is vertically adjustable on the plate 8 and bodily carries the spindle, so that the bearings for the spindle are relatively fixed, the head and spindle being adjusted as a unit relative to the column. The drive is applied directly to the spindle at a point interior of the shaft and between these fixed bearings, so that there is a minimum distance between the cutter and point of spindle drive. The bearings for the opposite ends of the spindle being a part of the one-piece head will maintain a perfect alinement, and by adjusting the head on the column the head and spindle as a unit are adjusted in perfect alinement. The head is adjusted vertically by the following instrumentalities:—A portion of the head face is slotted, through which the rack 16 projects, said rack being fixed to the head 5, see Fig. 4. 17 represents a pinion in mesh with the teeth of the rack 16 and fixed to or forming a part of the shaft 18. 19 represents a clutch sleeve fixed to the shaft 18 and revolved by the hand wheel 20 for feeding or adjusting the head quickly. 21 represents a worm wheel loosely mounted upon shaft 18, provided with clutch teeth 22, adapted to be engaged by the teeth of the clutch sleeve 19. 23 represents a screw threaded knurl upon the end of the sleeve 19, forming means for moving the sleeve to and from the worm wheel 21. When the sleeve 19 is brought into engagement with the worm wheel 21, the worm wheel is then in connection with the shaft 18 through the sleeve 19. When the sleeve 19 is disengaged from the worm 21, a quick feed to the head can be obtained by revolving hand wheel 20. 24 represents a worm fixed to shaft 25 and revolved by means of the hand wheel 26; this forming means for delicately adjusting the head. 28 represents a sheave fixed to shaft 18 carrying a chain, said chain carrying a counterbalance weight, not shown, by means of which a free movement of the head is obtained.

The gib-plate 8 is angularly adjustable on the vertical face of the column, a very slight adjustment serving the purpose. The outside gib-ways form sufficient mechanical clearance and the screws, shown in dotted lines, Fig. 3, have a loose fit sufficient for this purpose. The head carrying the top and bottom spindle bearings fits the gib-way of plate 8, and plate 8 carries a bearing for the driving spindle gear alined with the top and bottom bearings. Therefore, when the head is removed and the plate 8 adjusted precisely to a vertical position the gib-way will be alined to receive the head, and the bearing sleeve 9 will be alined with reference to the top and bottom bearings of the head.

Having described my invention, I claim:—

In a machine of the class described, a vertical column, a horizontal driving shaft therein horizontally projected through the column, a plate centered on the horizontal driving shaft and angularly adjustable relative thereto on the vertical face of the column, said plate having a bearing sleeve for the driving gear of the spindle, a head slidably mounted on said plate and in vertical ways formed in said column, a spindle journaled in said head, a driving gear on the spindle held in said sleeve bearing of said plate and splined to the spindle, a gear on the projecting end of the driving shaft engaging said spindle gear, and means for vertically feeding said head on said plate, substantially as described.

In testimony whereof, I have hereunto set my hand.

ADOLPH L. DE LEEUW.

Witnesses:
OLIVER B. KAISER,
LUISE BECK.